Figure 1:
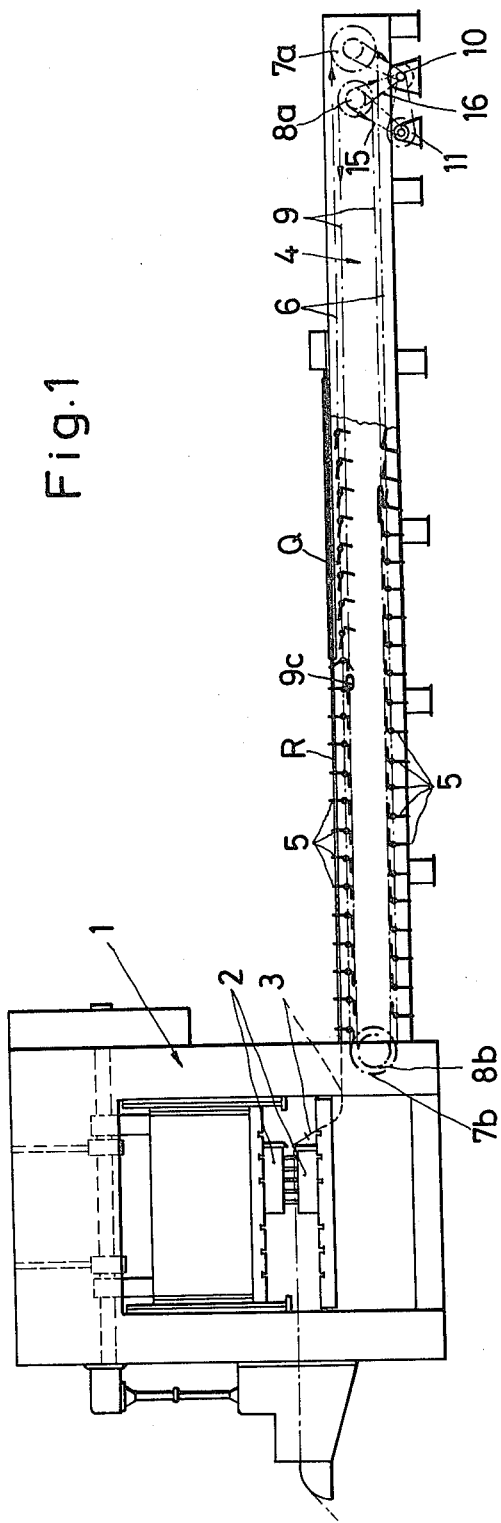

United States Patent [19]

Denner et al.

[11] 4,330,934
[45] May 25, 1982

[54] APPARATUS FOR PULLING TRANSVERSE FINS ONTO A PLURALITY OF PIPES

[75] Inventors: Peter Denner; Egon Ernst, both of Ratingen; Alfred Jockel, Essen, all of Fed. Rep. of Germany

[73] Assignee: Balcke-Dürr Aktiengesellschaft, Ratingen, Fed. Rep. of Germany

[21] Appl. No.: 148,309

[22] Filed: May 9, 1980

[30] Foreign Application Priority Data

May 26, 1979 [DE] Fed. Rep. of Germany ....... 2921416

[51] Int. Cl.³ ............................................. B23P 15/26
[52] U.S. Cl. ..................................................... 29/726
[58] Field of Search ................... 29/157.3 A, 157.3 B, 29/726, 793, 794, 795, 822, 823

[56] References Cited

U.S. PATENT DOCUMENTS

| | | | |
|---|---|---|---|
| 1,996,566 | 4/1935 | Boerger | 29/726 |
| 2,006,383 | 7/1935 | Boerger | 29/726 X |
| 2,133,932 | 10/1938 | Whistler et al. | 29/726 |
| 2,154,855 | 4/1939 | Lear | 29/726 |
| 2,247,730 | 7/1941 | O'Brien | 29/726 |
| 3,095,638 | 7/1963 | Seien | 29/726 X |
| 3,095,639 | 7/1963 | Seien | 29/726 X |
| 3,798,732 | 3/1974 | Schulenberg et al. | 29/726 |
| 3,798,733 | 3/1974 | Schulenberg et al. | 29/726 |
| 3,802,048 | 4/1974 | Schulenberg | 29/726 |
| 3,815,203 | 6/1974 | Schulenberg et al. | 29/726 |

FOREIGN PATENT DOCUMENTS 1099976  2/1961  Fed. Rep. of Germany ..... 29/157.3 A

Primary Examiner—Ervin M. Combs
Attorney, Agent, or Firm—Martin A. Farber

[57] ABSTRACT

An apparatus for pulling transverse fins onto a plurality of pipes which are arranged fixed in position alongside of each other by means of carriers the two ends of which are swingably supported on respective endless carrier conveyor chains between a work position engaging the fin plates and a disengagement position releasing the fin plates, the carriers being provided with a support foot which holds the carriers in the work position. The support foot is supported on support members of an endless control chain which extend over the respective length of the pull-on region for the transverse fins and are moved by the control chain opposite the direction of movement of the carrier conveyor chains for the displacement of the point of release of the carriers corresponding to the transverse fins which have already been pulled on. In order to reduce the friction and increase the reliability of operation, at least one control chain is constructed as a three-strand chain the outer strands of which are supported on stationary support rails while its central strand is a direct support for the support feet of the carriers solely in the pull-on region.

7 Claims, 5 Drawing Figures

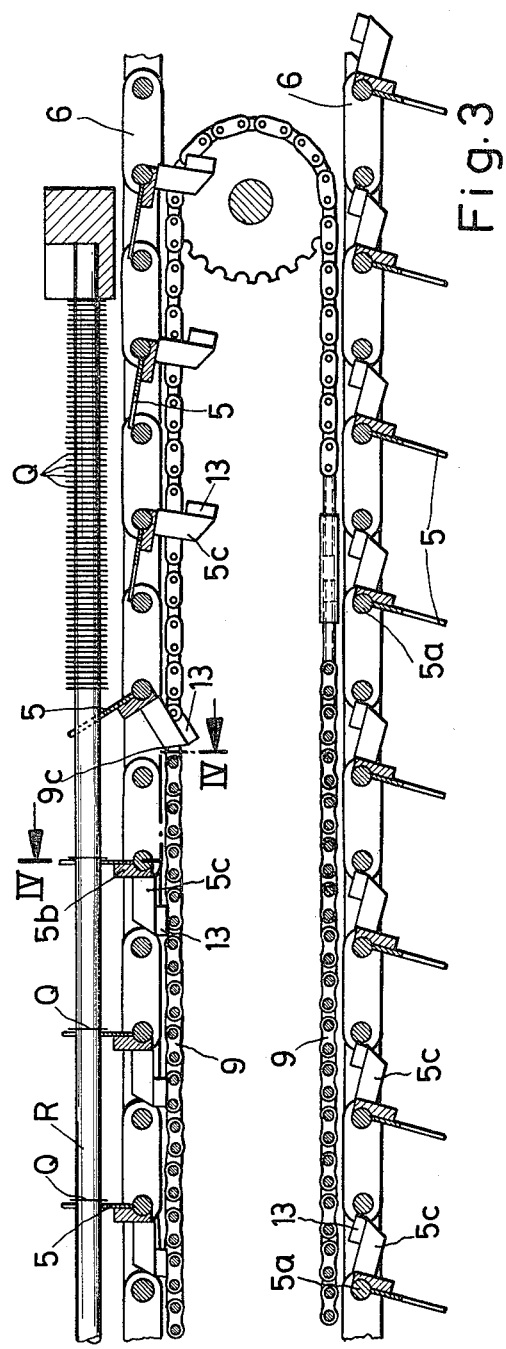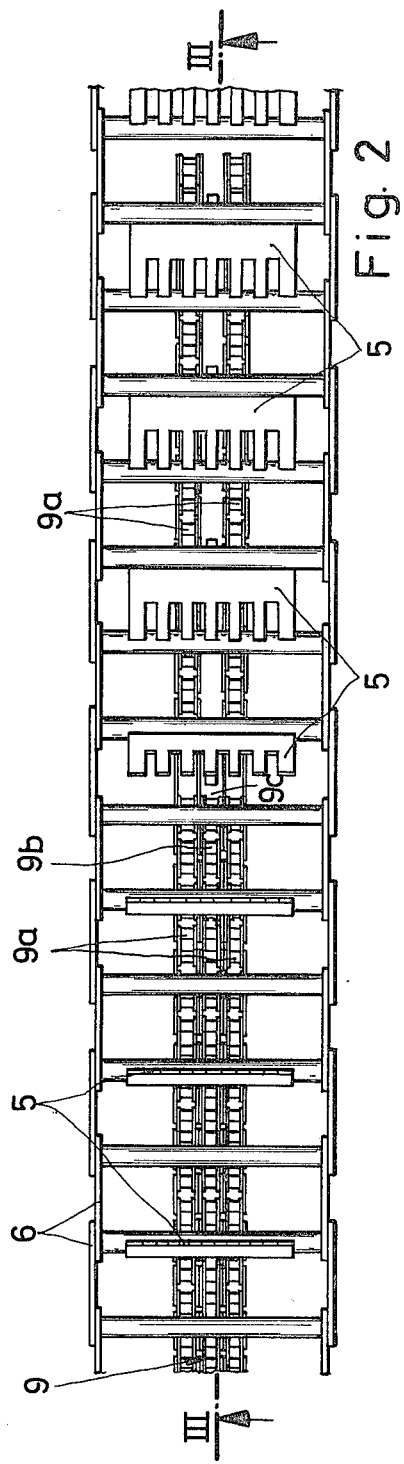

APPARATUS FOR PULLING TRANSVERSE FINS ONTO A PLURALITY OF PIPES

The present invention relates to an apparatus for pulling transverse fins onto a plurality of pipes which are arranged in fixed position alongside of each other by means of carriers the two ends of which are swingably supported on respective endless carrier conveyor chains between a work position engaging the fin plates and a disengagement position releasing the fin plates and are provided with at least one support foot which holds the carrier attachments in the work position and is supported on support members on an endless control chain which extend over the from time to time respective length of the pull-on region for the transverse fins and are moved by the control chain a direction opposite the direction of movement of the carrier conveyor chains in order to displace of the point of release of the carriers corresponding to the transverse fins which have already been pulled on.

One apparatus of the above-mentioned type is known from West German Pat. No. 1 752 831. In this known embodiment, the support members of the control device are developed as support jaws which are arranged on a chain. The last support jaw at the same time controls the release of the carriers so that they swing out of the work position into the release position as soon as the corresponding support foot has left the rear edge of this support jaw.

The known apparatus has the disadvantage that over the entire length of their pulling-on movement on the pipes the support feet slide with considerable friction over the support jaws so that not only is a considerable amount of energy required but a large amount of wear occurs, which wear is still further increased by the fact that the friction is increased by uneven application of the support feet against the support jaws, by support levers of short length and by moments of rotation which act on the support jaws as a result of the horizontally acting portions of the frictional forces.

The object of the present invention is to create an apparatus of the above-described type which, while avoiding the disadvantages described above and while being of simple construction, reduces the friction between the support feet of the carriers and the corresponding support members of the control chain and at the same time, while providing improved support for the control chain, increases the reliability in operation.

The attainment of this objective by the invention is characterized in the manner that the control chain is constructed as a three-strand chain the outer strands of which are supported on support rails which are fixed in place and the central strand of which is provided as a direct support for the support feet of the carriers solely in the pull-on region.

By this development in accordance with the invention, there is obtained not only a very good support of the control chain on fixed support rails but also a structurally simple dependably operating low-friction support of the support feet of the carriers since, while avoiding additional support jaws, they slide directly on the central strand of the three-strand control chain. If, in accordance with another feature of the invention, this control chain is developed as a three-strand roller chain with rollers which can rotate freely independently of each other, there is obtained a quasi-rolling friction which not only has lower frictional forces but also results in considerably less wear. Since the central strand of the three-strand endless control chain is provided only in the pull-on region, the support feet of the carriers can, after the release of the transverse fins, be swung into the disengaged position without being prevented from doing so by the control chain. The supporting of the control chain on fixed support rails on both sides of and directly adjacent to the central strand finally results in a reliable guiding of the carrier support feet without excessive load on the control chain.

In accordance with another feature of the invention, each support foot is connected with the carrier by a lever arm so that the supporting force which is transmitted to the control chain is small corresponding to the length of the lever arm. The longest possible lever arm extends in accordance with the invention on the rear side of the carrier approximately perpendicular to its carrying or driving surface.

In one preferred embodiment of the invention, the carriers are supported in freely rotatable manner on a shaft which extends continuously between the carrier conveyor chains and carries, outside the carrier conveyor chains, a travel roller which rolls on a stationary travel rail. In this way a reliable supporting and guiding of the flights is obtained with a simple structural development.

The invention finally proposes having the rollers of the outer strands of the control chain roll on the arms of a support rail of U-shaped cross section, said rail being arranged in fixed position in the center between the travel rails over the entire length below the upper course of the control chain. This development in accordance with the invention is not only structurally simple but results in good dependability of operation with the best possible precision since the supporting of the control chain on the stationary guide rails is also effected by means of rolling friction.

Figure 4:
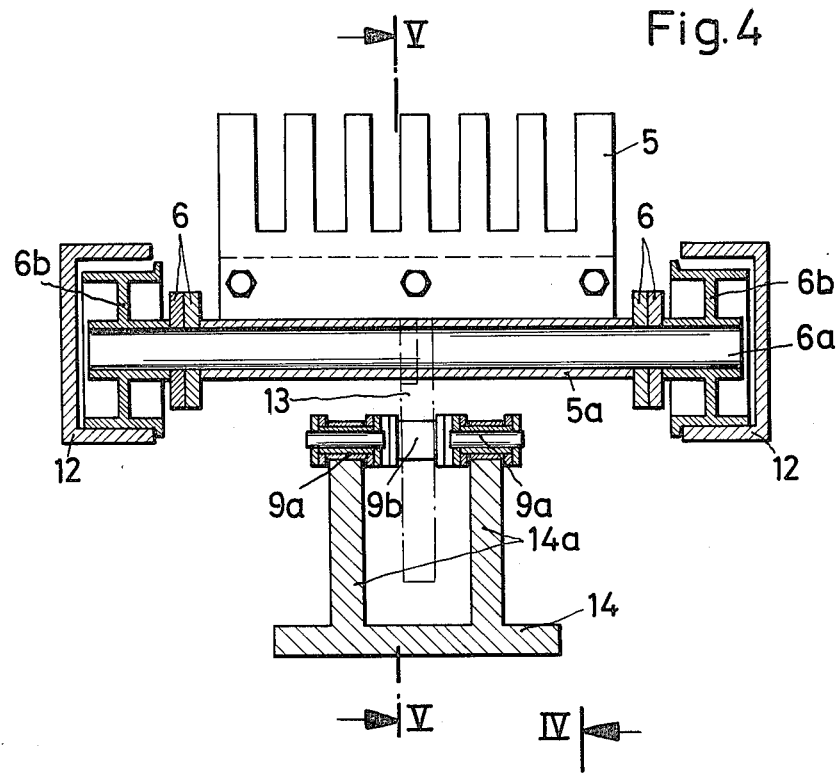
Figure 5:
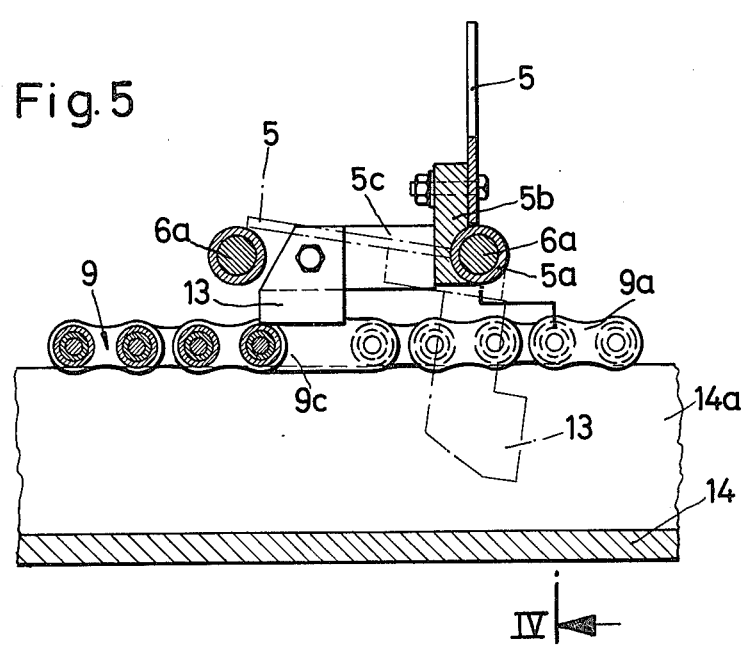

One illustrative embodiment of the apparatus of the invention is shown in the drawings in which FIG. 1 is a diagrammatic side view of the entire apparatus, FIG. 2 is a top view of a part of the apparatus shown on a larger scale, FIG. 3 is a longitudinal section along the section line III—III of FIG. 2, FIG. 4 is a cross section through the apparatus along the section line IV—IV of FIG. 3, seen on a larger scale, and FIG. 5 is a longitudinal section along the section line V—V of FIG. 4.

The apparatus which is shown diagrammatically in side view in FIG. 1 operates together with a punch 1 which is developed, for instance, as an eccentric press and delivers transverse fin plates Q which are pulled onto a plurality of pipes R which are arranged fixed in position alongside of each other. In the embodiment shown in the drawing there are six such pipes R which are equipped by the delivery operation plates Q.

The transverse fin plates Q produced by the punch 1, for instance from strip material by means of punch tools 2, are fed by means of a guide 3 to a pull bench 4 which adjoins the punch 1 and has carriers 5 which pull the transverse fin plates Q onto the pipes R with a predetermined distance between the fins. The carriers 5 are arranged on carrier conveyor chains 6 which conduct the transverse fin plates Q, each of which covers all six pipes R, from the punch 1 up to the predetermined place on the pipes R. For this purpose the carrier conveyor chains 6 are endless and guided on sprocket wheels 7a and 7b.

The pull-on path for the fin plates Q, i.e. the distance from the punch 1 to the from time to time respective place on the pipes R, becomes smaller with the number of transverse fin plates Q which have already been pushed onto the pipes R. Since the transverse fin plates Q must be held with their surface at all times at right angles to the longitudinal direction of the pipes R while they are being pushed onto the pipes R, the carriers 5 are held in a so-called work position over the entire pull-on path. Only when the respective fin plate Q has reached its final position on the pipes R and the carriers swung into a disengaged position, in which they release the respective transverse fin plate Q.

In the region of the pull-on path, the carriers 5 are held in the work position by a control chain 9 which is guided over sprocket wheels 8a and 8b. This control chain 9 as well as the carrier conveyor chains 6 are driven by a drive motor 10 via a feed gear 11 and a feed drive 15 as a function of the speed of the carrier conveyor chains 6 but in opposite direction of motion since the release point 9c where the carriers 5 swing from the work position into the disengaged position moves in the direction towards the punch 1 as the number of transverse fin plates Q placed on increases. After termination of the entire pulling-on process the control chain 9 is returned via the recovery drive 16 to its initial position.

As can be noted in particular from FIGS. 2 to 4, the carrier conveyor chains 6 are constructed as sprocket chains which are connected with each other by a shaft 6a. This shaft 6a extends on both sides beyond the carrier conveyor chains 6 and carries on each of its ends a travel roller 6b, these rollers resting on fixed travel rails 12. These travel rails 12 as well as the travel rollers 6b have been omitted from FIGS. 2 and 3 for the sake of clarity of the figures.

Each carrier 5, whose comb-like development can best be noted from FIG. 4, is freely turnable by means of a sleeve 5a on the shaft 6a. On its rear it has a mounting part 5b which is connected with the sleeve 5a. On this mounting part 5b there is arranged one lever arm 5c for each carrier 5, the lever arm having a support foot 13. This support foot 13 is located in the center of the flight 5 and is supported, in the region of the pull-on path, against the control chain 9 which for this purpose is constructed as a three-strand chain, namely as a roller chain with three rows of rollers turnable independently of each other.

While the two outer strands 9a of the control chain 9 are endless, the central strand 9b extends merely over the region of the pull-on path. The support feet 13 of the flights 5 are thus held in the work position, exclusively in the region of the pull-on path, by the central strand 9b of the control chain 9, while the absence of the central chain 9b adjoining the pulling-on path permits a swinging of the flights 5 out of the work position into the disengagement position, as shown in FIGS. 1 and 3. In order to assure a good support of the support feet 13 which roll on the rollers of the central strand 9b, the two outer strands 9a of the control chain 9 are supported, over the entire length of the pull-on bench 4, on the arms 14a of a support rail 14 of U-shaped cross section which is arranged fixed in position and can be noted from FIGS. 4 and 5. By the use of rollers which are turnable independently of each other, rolling friction is obtained, upon movement of the control chain 9, both between the outer strands 9a of the control chain 9 and the arm 14a of the support rail 14 and between the support feet 13 of the carriers 5 and the central strand 9b of the control chain 9.

The transverse fin plates Q delivered by the punch 1 pass via the guides 3 to the pull-on bench 4 where they are each grasped by a carrier 5. These carriers 5 which are arranged between the flight conveyor chains 6 are moved, by the rotation of the carrier conveyor chains 6, from the punch 1 in the direction towards the part of the pipes R which is already provided with fins. Over the entire pull-on path the carriers 5 are held by means of their support feet 13 in the work position in which they engage the transverse fin plates Q since each support foot 13 rests on a central strand 9b of the control chain 9. In this connection the support foot 13 rolls over the freely rotating rollers of the central strand 9b.

As soon as the carrier 5 transporting the transverse fin plate Q in question leaves the last roller of the central strand 9b of the control chain 9, the support foot 13 terminates its support function and releases the carrier 5, so that the latter can swing into the disengaged position. This carrier 5 swings away rearward so that the transverse fin plate Q remains in the position which it has now reached on the pipes R. Since the central strand 9b of the control chain 9 is thereafter absent, there is nothing to impede the free swingability of the carrier 5 after it has been released. It passes in its disengaged position to the end of the upper course and then along the lower course back to the punch 1, where the process described above in repeated for each carrier 5.

Since the point of release of the carriers 5 shifts in the direction towards the punch 1 as the attachment of the fins to the pipes R progresses, the control chain 9 is displaced opposite to the direction of movement of the carrier conveyor chains 6. This displacement takes place synchronously as a function of the speed of the carrier conveyor chains 6. The transport path for the transverse fin plates Q thus becomes smaller and smaller as the finning process progresses. As soon as the pipes R have been fully equipped with fins, they are taken off from above from the pull-on bench 4 and replaced by new pipes R, which in their turn are equipped with transverse fin plates Q in the manner which has been described above.

By means of the recovery drive 16 shown in FIG. 1 the control chain 9 is first of all moved back into the starting position.

We claim:

1. In an apparatus for pulling transverse fin plates onto a plurality of pipes which are arranged fixed in position alongside of each other by carriers, two ends of which are operatively swingably mounted onto respective conveyor chains between a work position engaging the fin plates and a disengagement position releasing the fin plates, the carriers each being provided with a support foot which holds the carriers in the work position, the support foot being supported on support members of an endless control chain which support members extend over a respective length of a pull-on region for the transverse fin plates and said support members are moved by means of the control chain in an opposite direction to the direction of movement of the carrier conveyor chains in order to displace a point of release of the carriers corresponding to the transverse fin plates already pulled on the pipes, the improvement wherein
    at least one said control chain is formed as a three-strand chain having outer strands and a central strand therebetween, stationary support rails, said outer strands are supported on said stationary support rails, and said central strand is formed of said support members and constitutes means for directly supporting said support feet of said carriers, respectively, exclusively in the pull-on region.

2. The apparatus according to claim 1, wherein said three-strand chain constitutes a three-strand roller chain having a plurality of rollers which are freely rotatable independently of each other.

3. The apparatus according to claim 1, further comprising one lever arm connecting each said support foot with said carrier, respectively.

4. The apparatus according to claim 3, wherein said carriers each have a fin plate carrying surface, and each said lever arm extends on a rear side of said carrier approximately at right angles to said fin plate carrying surface of said carrier.

5. The apparatus according to claim 1, wherein said carrier conveyor chains are formed with two strands of conveyor chains and a plurality of shafts extends between said two strands of conveyor chains and passes therethrough to beyond said two strands of said conveyor chains, a travel roller is mounted on each end portion of each said shaft beyond said two strands of said conveyor chains, stationary travel rails on respective sides of and beyond said two strands of said conveyor chains, said travel rollers roll on said travel rails, respectively, and said carriers are freely rotatably mounted on said shafts, respectively.

6. The apparatus according to claim 5, wherein said three-strand chain constitutes a three-strand roller chain having a plurality of rollers which are freely rotatable independently of each other, a supporting rail having a U-shaped cross-section having arms is stationarily arranged centrally between said travel rails over the entire length of and below an upper course of said at least one control chain, said arms constituting said support rails, and said rollers of said outer strands of said at least one control chain roll on said arms, respectively, of said supporting rail.

7. The apparatus according to claim 1, wherein parallel to each other, and said central strand is connected to said outer strands is non-endless and has a limited length.

* * * * *